Figure 1:
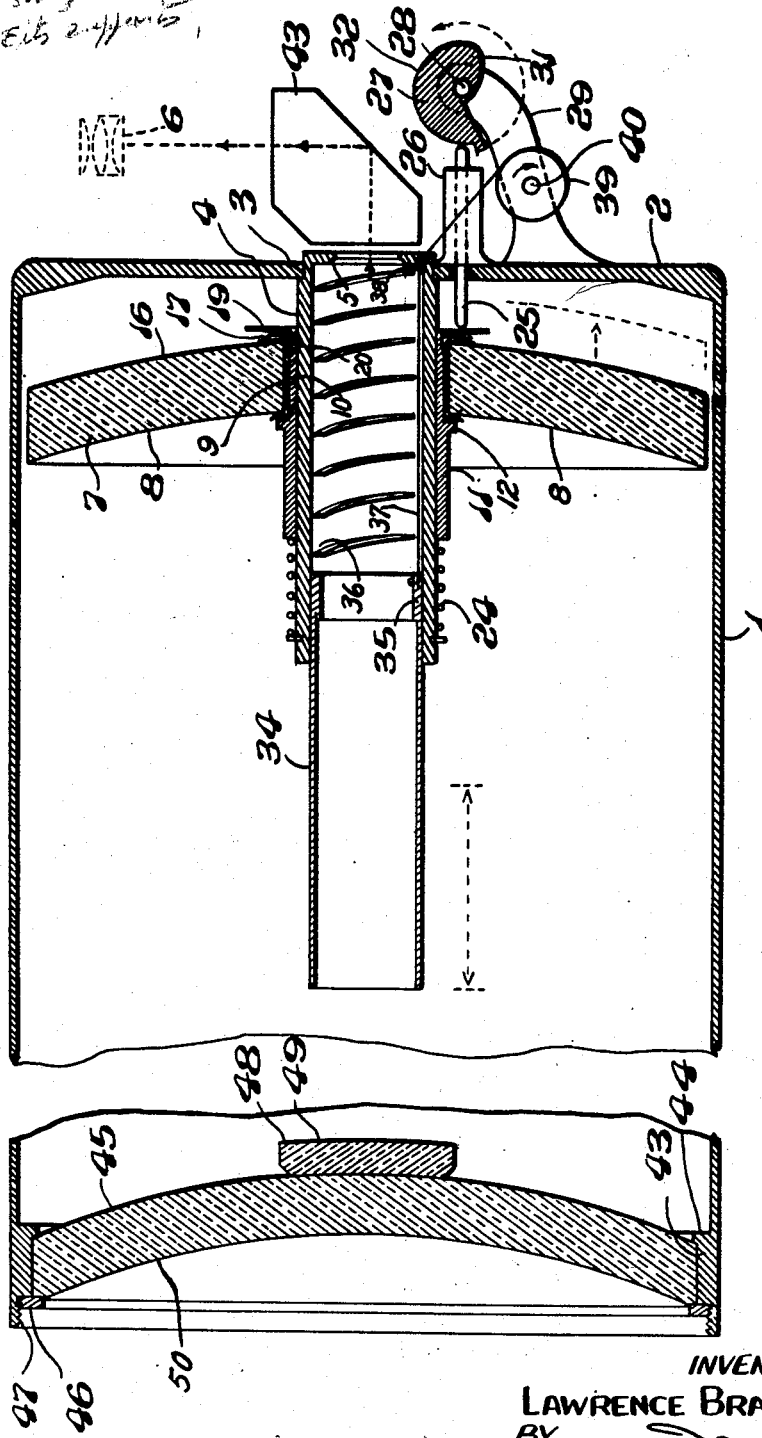

March 2, 1954

L. E. BRAYMER 2,670,656

TELESCOPE

Filed Nov. 25, 1947

5 Sheets-Sheet 1

INVENTOR
LAWRENCE BRAYMER
BY
HIS ATTORNEY

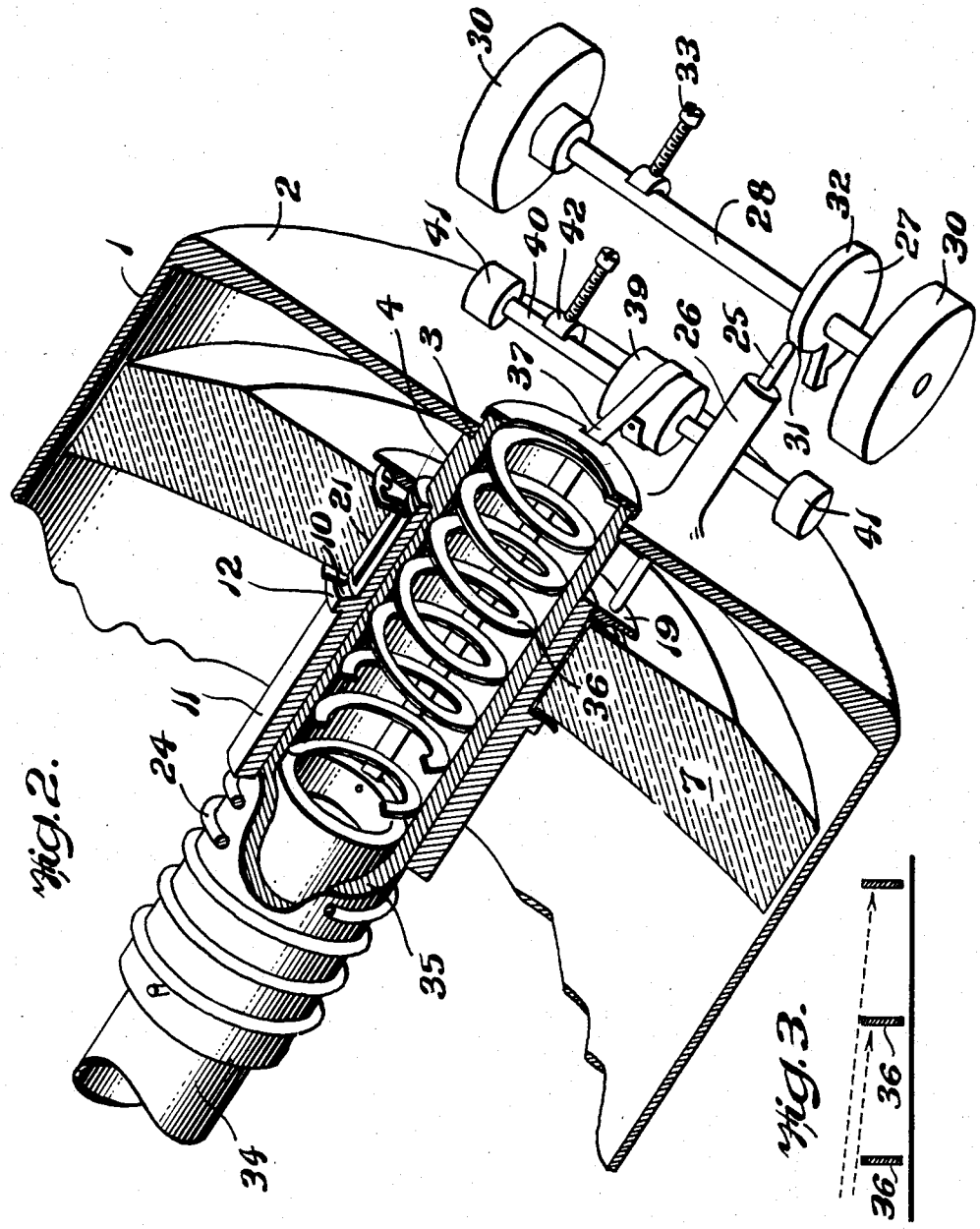

March 2, 1954   L. E. BRAYMER   2,670,656
TELESCOPE
Filed Nov. 25, 1947   5 Sheets-Sheet 3
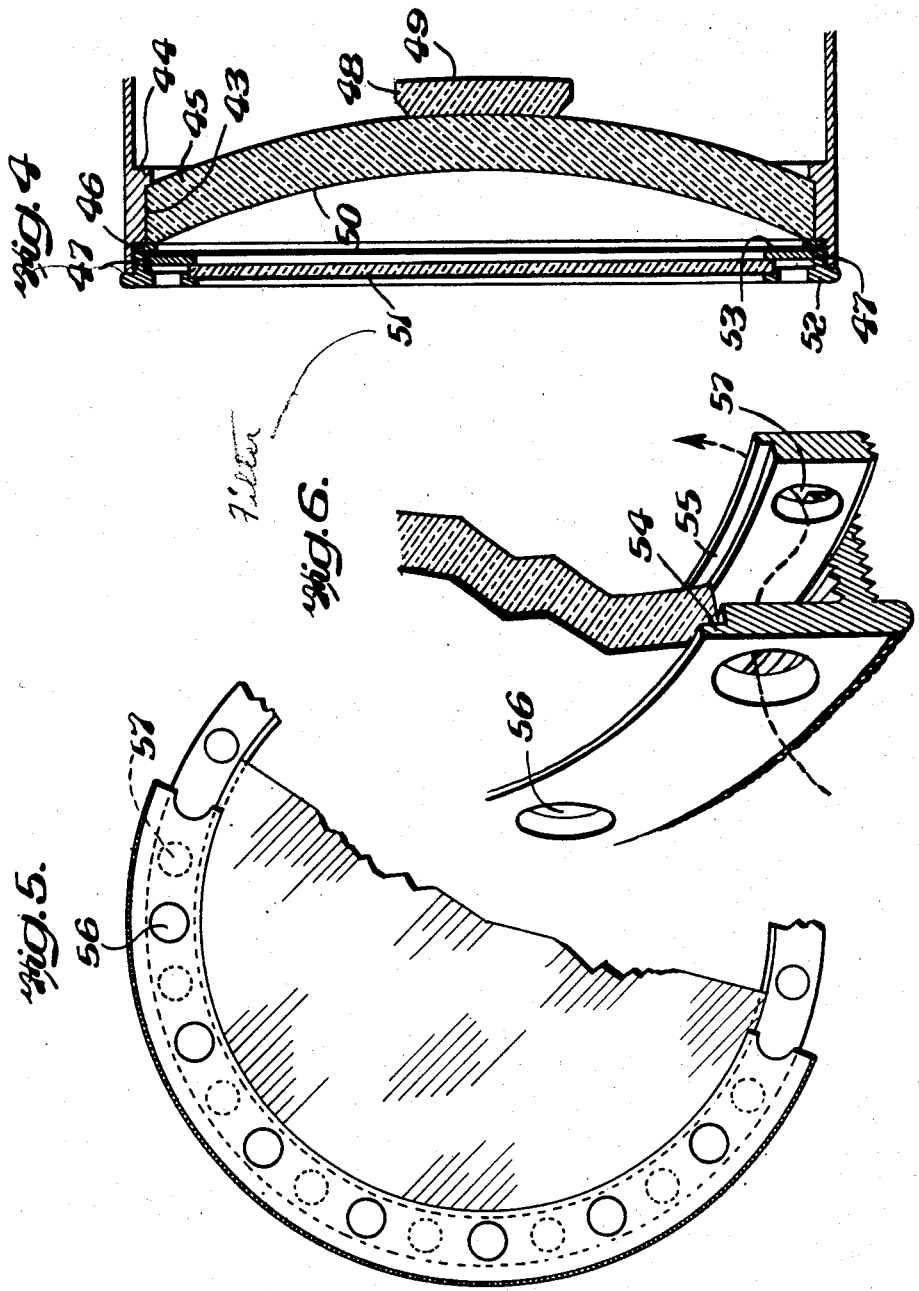
INVENTOR
LAWRENCE BRAYMER
BY
HIS ATTORNEY March 2, 1954 L. E. BRAYMER 2,670,656
TELESCOPE
Filed Nov. 25, 1947 5 Sheets-Sheet 4

INVENTOR.
LAWRENCE BRAYMER
BY

HIS ATTORNEY

March 2, 1954     L. E. BRAYMER     2,670,656
TELESCOPE
Filed Nov. 25, 1947     5 Sheets-Sheet 5
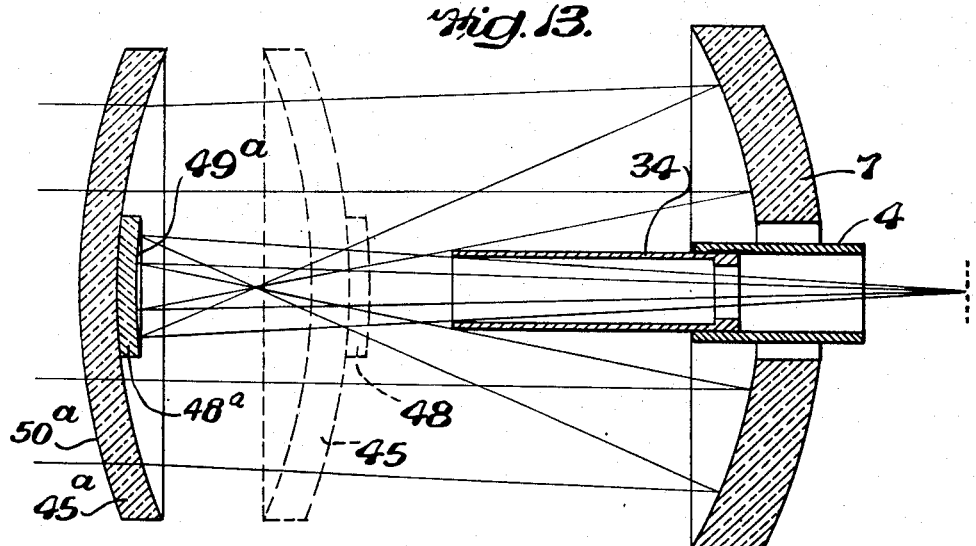
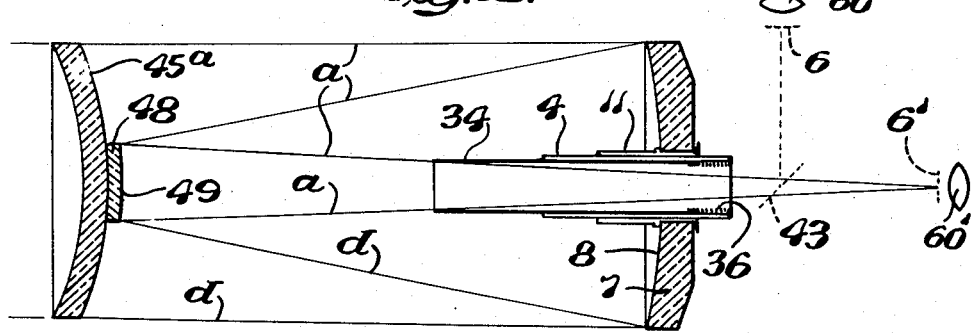
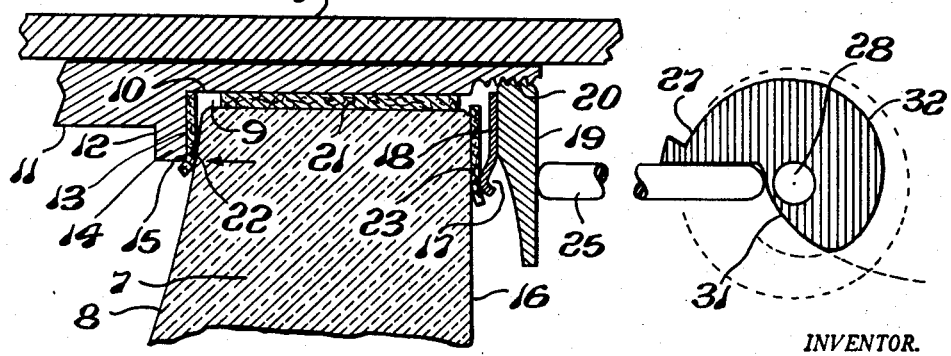
INVENTOR.
LAWRENCE BRAYMER
BY
HIS ATTORNEY

Patented Mar. 2, 1954

2,670,656

UNITED STATES PATENT OFFICE 2,670,656

TELESCOPE

Lawrence E. Braymer, Lahaska, Pa.

Application November 25, 1947, Serial No. 787,995

8 Claims. (Cl. 88—32)

My invention relates to telescopes of the Maksutov-Cassegrain type or of the Maksutov-Gregorian type such as are described in the Journal of the Optical Society of America, vol. 34, page 270. In such telescopes the negative aspherical aberration and coma ordinarily resulting from the use of a concave spherical mirror are substantially neutralized by the positive spherical aberration of an achromatic meniscus, viz., a lens formed from optical glass of a nearly constant thickness, but with considerable curvatures of surfaces suitably chosen as set forth in such article.

It is a primary object of my invention to produce economically a compact instrument suitable for use during darkness as an astronomical telescope and suitable for use during daylight as a solar or terrestrial telescope and capable of forming a sharp and brilliant image under either condition of use.

All forms of Cassegrain and Gregorian telescopes heretofore constructed have been of little use for daylight, terrestrial observation largely because of the flooding of the image focal plane with unfocused rays entering the optical system around the periphery of the characteristic secondary reflector of the telescope.

In its preferred form, my improved telescope comprises a primary mirror adjustably supported wholly at its center, and kept in alignment by a mounting making line contact, through a thermal insulator, with the curved surface of the reflector adjacent to a central opening therein.

The mounting supporting the primary mirror is axially movable, for focusing the instrument, along a guideway carried by the end closure of a barrel surrounding the mirror but thermally insulated therefrom. Slight axial movements of the primary mirror permit focusing on objects at any distance from infinity to a few feet without moving the ocular. Slow axial movement for focusing for considerable distances to infinity, and rapid axial movement for short distance focusing may be conveniently effected by means of an involute spiral and mounted in a position offset from the optical axis of the telescope.

The opposite end of the barrel has a transparent closure having at its center a secondary mirror concentric with the optical axis and preferably aligned with an image opening of the primary mirror for reflecting therethrough image rays converged by the primary mirror. This secondary mirror may have a convex reflecting surface positioned within the principal focal point of the primary mirror, or it may have a concave reflecting surface positioned beyond the principal focal point of the primary mirror.

The admission of light to the focal image plane is controlled by a thin-walled tube surrounding the common optical axis of the mirrors. Image-forming rays are reflected by the secondary mirror through such tube to the image focal plane. Extraneous light is excluded from such plane by advancing the tube toward the secondary mirror so as to exclude from the image focal plane rays entering the barrel around the periphery of the secondary reflector. The extension of the tube gives the effect of increasing the area of the central obstruction formed by the secondary mirror. The extension of the tube also has the effect of reducing the diameter of the outer periphery of the transparent closure so as to reduce the effective aperture of the instrument. Such reduction of effective aperture minimizes the detrimental effects on the image of atmospheric disturbances or of window glass of irregular density and refractive index. The production of clear images under unfavorable conditions is thereby facilitated.

The tube may be still further extended to reduce the total light admitted to the image plane when the instrument is used for solar observation through a ventilated light filter.

The operation of the tube may be conveniently effected by means of a rotatable, friction loaded reel offset from the optical axis and suitably connected with the tube. The tube and primary reflector mounting are preferably biased in opposite directions by coiled springs, one of which acts as a series of diaphragms intercepting low-angle rays of light which might otherwise be reflected to the image plane.

The principles of my invention, and the best mode in which I have contemplated applying those principles, will further appear from the following description and the accompanying drawings in illustration thereof.

Figure 8:
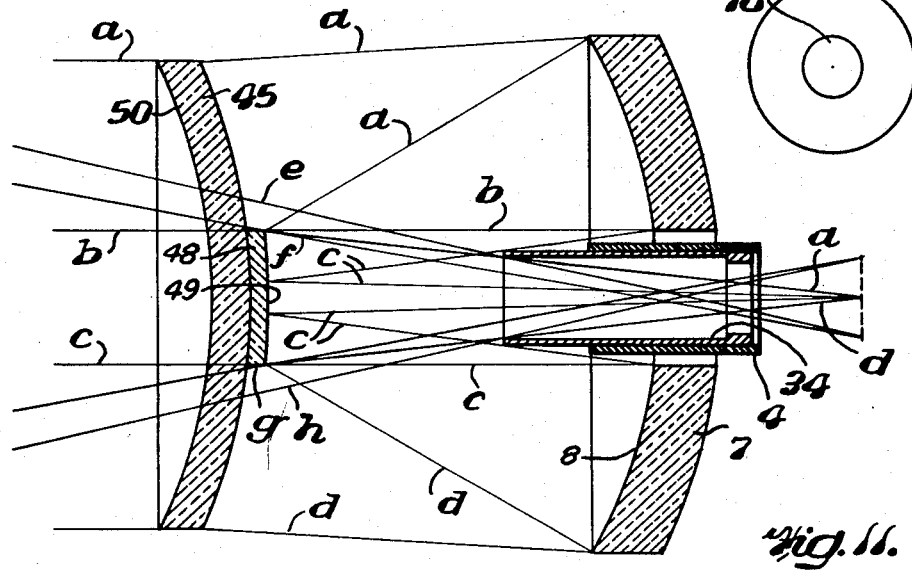
Figure 9:
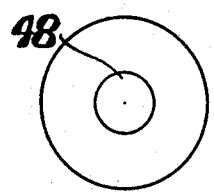
Figure 10:
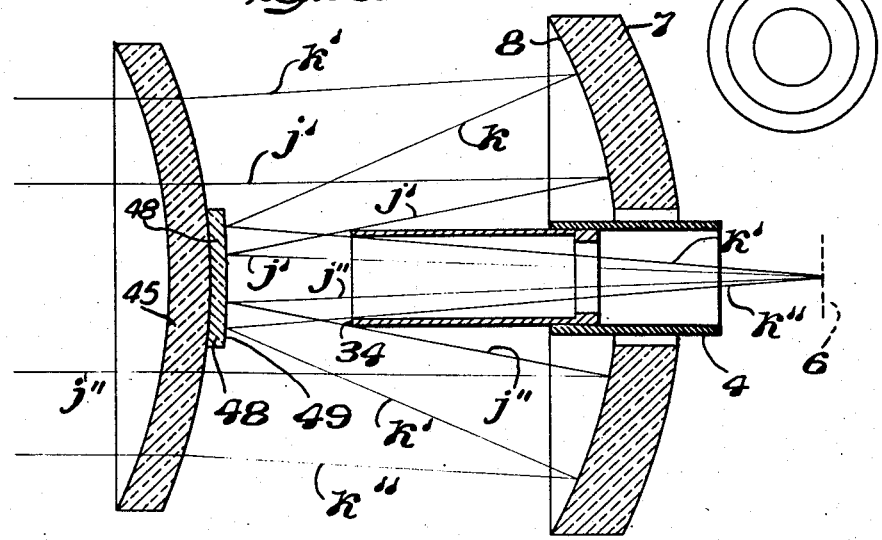
Figure 11:
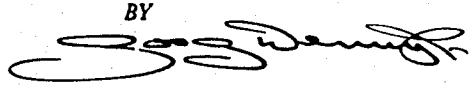

In the drawings, Fig. 1 is a longitudinal, sectional view, partly diagrammatic, of a reflecting telescope of the Maksutov-Cassegrain type embodying my invention; Fig. 2 is a fragmentary, sectional, perspective view, with parts broken away, of parts of the telescope shown in Fig. 1 at the inner end thereof; Fig. 3 is a fragmentary, diagrammatic view illustrating the interception of low angle light rays by the helically coiled, flat wire ribbon forming the inner compression spring shown in Figs. 1 and 2; Fig. 4 is a fragmentary, longitudinal, sectional view of the outer end of the telescope shown in Fig. 1 with a ventilated solar filter applied thereto; Fig. 5 is a fragmentary, end view of the structure shown in Fig. 4; Fig. 6 is an enlarged, fragmentary, perspective view of the solar filter and its mounting rings shown in Figs. 4 and 5; Fig. 7 is a greatly enlarged, fragmentary sectional view of the mounting of the primary or mirror, and of the actuator therefor; Fig. 8 is a diagram of the Maksutov-Cassegrain System used, illustrating unimpeded, classical and completely typical light ray paths at full effective aperture; Fig. 9 is a diagram illustrating the classical appearance of the aperture of a conventional Maksutov-Cassegrain telescope and of my improved telescope at full aperture; Fig. 10 is a diagram of the same elements shown in Fig. 8 but with the masking tube of my invention advanced to exclude extraneous rays from the focal plane as though the central obstruction were enlarged and to reduce the effective aperture inward from the periphery; Fig. 11 is a diagram similar to that shown in Fig. 9 and illustrating the effect on the effective aperture of the advance of the masking tube; Fig. 12 is a diagrammatic view of the optical and mechanical elements of Fig. 1 with the masking tube retracted and with the parts proportioned and positioned in approximate working relationship to one another; and Fig. 13 is a diagrammatic illustration of the application of the principles of my invention to a telescope of the Maksutov-Gregorian type, in contrast with the application of such principles to a telescope of the Maksutov-Cassegrain type.

Figs. 1 to 12 of the drawings illustrate the application of the principles of my invention to a reflecting telescope of the Maksutov-Cassegrain type. In this embodiment of my invention, an opaque, cylindrical barrel 1 has an integral inner end 2 containing an opening 3 concentric with the barrel 1 and in which is fixed the inner end of a hollow cylindrical metal hub 4 having formed on or attached to the inner end thereof an inturned, beveled flange 5 forming a frame or rim which may be used to outline the image area at an image focal plane 6 or 6'.

A primary mirror of speculum 7 having a spherically concave reflecting surface 8, contains a central opening 9 for the reception of a ferrule 10 formed by the reduced end of a metal collar 11 sleeved on the hub 4 and making therewith a close slip fit permitting free rotation and axial movement of the collar and mirror without contact of the latter with the barrel 1.

One end of the ferrule 10 is bounded by a circumferential flange 12 between the ends of the collar (Figs. 1 and 7). The flange 12 has a radial face 13 intersecting its peripheral surface 14 to form an annular edge 15 providing a line support or making line contact with the spherically concave surface 8 around the hole 9 of the mirror 7. The surface 8 is yieldingly biased toward the annular edge 15 by the engagement of the opposite face 16 of the mirror by the circumferential bead 17 of a spring washer 18 which is adjustably positioned by a nut or ring 19 screwed onto the threaded end 20 of the ferrule 10.

Preferably the mirror 7 is thermally insulated from its support by thermally non-conductive material 21, 22, 23 having a thermal conductivity of the order of or below that of glass, as, for example, of sheeted cellulose acetate, cork, paper or cloth.

The positioning of the primary mirror by the line contact of the central portion of its spherical surface with an annular sharp edge obviates the need for precise concentricity of the hole 9 with the optical axis, and the surface of revolution of the mirror is automatically located so that its principal focal point lies in the optical axis of the instrument. The spacing and insulation of the mirror from the ferrule, and from the flange and nut thereon, reduces distortion of the mirror by thermal shock or localized thermal conduction.

The collar 11 is biased axially by a compression spring 24, coiled around an anchored to the hub 4, to move the mirror 7 in the direction of the arrow away from infinity focus position shown in Fig. 1 toward close-up focus position indicated by the curved dotted line adjacent to the closure 2. The latter movement is controlled, and reverse movement effected, by engagement of the ring 19 by a plunger 25 reciprocable in the boss 26 on the closure 2 under control of a cam 27. The cam 27 is fixed on a shaft 28 which is journalled in the bracket 29 of the closure 2 and is provided with knurled knobs 30 for rotating the shaft and cam (Figs. 1, 2 and 7). The cam 27 has a peripheral face or profile engaging the end of the plunger 25 and part of which forms a steep incline 31 effecting large axial movements of the plunger and reflector relatively to the rotation of the shaft 28 when focusing on objects close at hand. The remainder of the cam profile forms a gradual volute 32 which effects small movements of the plunger and mirror relatively to the rotation of the shaft 28 when focusing on distant objects or infinity.

The shaft 28 may be held against the transmitted thrust of the spring 24 by a brake or lock 33 of any conventional type mounted on the bracket 29.

An opaque, thin-walled masking tube 34 is telescoped within the hub 4 and has a thickened rim 35. A helix 36, having spaced coils or circumvolutions of flat, resilient wire, is housed within the hub 4 between the flange 5 and the rim 35, and acts as a compression spring tending to bias the masking tube 34 outward, viz., away from the mirror 7. The narrow inner edges of the coils of the helix 36 preferably extend inwardly beyond the surface of the rim 35, and these coils act as baffles intercepting and trapping any low-angle light rays which otherwise might be reflected from the smooth internal wall of the hub. A flexible connector 37 is fixed to the rim 35, passes between the inner wall of the hub 4 and the outer edges of the helix 36, passes through a slot 38 in the flange 5 and is wrapped around the fixed to a spool or reel 39. The reel 39 is fixed on a shaft 40 journalled in the bracket 29 and provided with knurled knobs 41 so that the reel 39 may be readily rotated to wind or unwind the connector 37 and move the tube 34 contra to the biasing action of the spring 36 or permit the latter to move the tube 34 outwardly. The shaft 40 may be held against the transmitted thrust of the spring 36 by a brake or lock 42 of any conventional type mounted on the bracket 29.

It will be noted that the external mechanism for controlling the collar 11 and tube 34 is all offset from the hub 4 so that it can be conveniently operated without in any way interfering with the positioning of an Amici prism 43 or other optical accessory such as an ocular, photographic film or iconoscope matrix in the optical axis of the telescope in any desired relation to the image focal plane thereof.

The outer end of the barrel 1 is provided with an integral rim 43 having an inwardly extending flange 44 and forming a seat concentric with the barrel 1 for the correcting meniscus lens 45 which is held in place by a threaded ring 46 screwed into the threaded outer end of the barrel. A secondary mirror 48 is attached to the interior central area of the meniscus 45, with the convex reflecting surface 49 of the reflector 48 at a distance from the mirror 7 less than the focal length thereof and with the optical of the reflecting surface 49 in the optical axis of the primary mirror 7 and the meniscus lens 45. The perimeter of the secondary mirror 48 extends radially beyond the wall of the masking tube 34.

As illustrated in Figs. 4 to 6, the light falling upon the collecting surface 50 of the lens 45 may be reduced by inserting a light filter 51 in the mouth of the barrel 1. This filter preferably consists of a plane-parallel thin glass plate free from striae or noticeable flaws and having a metalized first or outward surface. The filter 51 may be attached to the barrel 1 by the threaded ring 52 screwed into the threaded end 47 of the barrel and by the ring 53 screwed into the ring 52 to grip the peripheral edge of the filter in the grooves 54 and 55 formed in the respective rings 52 and 53. The rings 52 and 53 are provided with ventilating apertures 56 and 57 by which free ventilation is provided of the space between the filter 51 and the lens 50 without admitting any direct light rays to the latter.

As illustrated in Fig. 13, there may be substituted for the convex mirror 48 a concave mirror 48$^a$ mounted at the center of the meniscus lens 45$^a$ having a curvature opposite to that of the lens 45. The reflecting concave surface 49$^a$ of the mirror 48$^a$ is positioned at a distance from the primary reflector 7 greater than the focal length of the latter, and the center of the reflecting surface 49$^a$ lies in the optical axis of the reflector 7 and of the meniscus lens 45$^a$.

When a telescope embodying my improvements is used for observation when there are few, if any, light rays extraneous to those emanating from the observed object, as, for instance, in celestial observation at night, the filter 51 is removed, and the masking tube 34 is fully retracted so as to permit ingress of maximum light from the observed object through the meniscus lens 45. The lens 45 and surface 8 are curved complementary to one another in accordance with the principle of the Maksutov telescope so as to impart to the image rays reflected by the surface 8 substantially the same effect as though the surface 8 were a parabolic mirror. The rays reflected by the surface 8 are converged toward the reflecting surface 49 and are reflected thereby through the retracted tube 34 and hub 4 to the focal image plane 6 or 6', depending upon the presence or absence of the Amici prism 43.

For celestial observation at night, the mirror 7 would ordinarily be positioned in approximately its foremost position, as illustrated in Fig. 1, but may be shifted axially to vary the size and plane of the image to accommodate oculars of different aperture or the individual characteristics of the eye of the observer.

To secure the maximum brilliance of image, it is desirable that the minimum possible light obstruction be caused by the secondary mirror, which lies between the object and the image focal plane, and to secure a sharply defined image at the image focal plane, it is essential that all rays reaching the image focal plane be converged to image points at such plane.

Maksutov-Cassegrain and Maksutov-Gregorian telescopes are so designed that all rays substantially parallel to the optical axis and falling on the collecting surface are converged by the optical elements to image points at the image focal plane; but rays which are not parallel to the optical axis and impinge on the collecting surface adjacent to the periphery of the secondary reflector of a usual reflecting telescope may pass through the image opening of the primary mirror without traversing the mirrors and hence without having been converged toward image points, and these unconverged rays flood the image plane and blur the image. Hence, such telescopes have heretofore been used for celestial observations at night and have been of little use for terrestrial observations by day.

In accordance with my invention, there may be converged to image points at the image plane 6 or 6' substantially all the light falling on the clear aperture 50, when such light emanates entirely or dominantly from an infinitely distant, luminous object under observation. The rays of such light are substantially parallel with one another. When the optical axis of my improved telescope is positioned parallel to such rays and the masking tube 34 is fully retracted, the rays are all refracted and reflected to form image points at the image focal plane 6 or 6'. This is graphically illustrated, in Figs. 8 and 12, by the lines $a$, $b$, $c$ and $d$ indicative of the paths of parallel rays after they have impinged on the lens surface 50 between the outer periphery thereof and the periphery of the obstructing mirror 48. Hence, when the tube 34 is fully retracted, the apparatus operates satisfactorily, at full effective aperture, to produce sharp, brilliant images. The instrument illustrated has a barrel whose length need not exceed three times its diameter and the focal length is approximately eleven times the diameter and three and two-third times the length of the barrel, and produces images of fine detail and brilliancy. The brilliance of such images permits high magnification thereof by an ocular 60 or 60'. The size and position of the image may be varied by slightly shifting the position of the reflector 7 by turning the cam 27, as above described.

When daylight observation of an object is attempted without a masking tube or with the masking tube fully retracted, as above described, ambient light, extraneous of the image rays from the object under observation, impinges on the collecting surface 50 at various angles to the optical axis of the instrument and this stray light entering the annular zone adjacent to the periphery of the reflector 48 at an angle to the optical axis passes to the focal image plane 6 or 6', as indicated by the lines $e$, $f$, $g$, $h$ of Fig. 8 without being converged to image points. Consequently, the image focal plane is flooded with unfocused light, sometimes called skylight, which obliterates or obscures the image formed at the image plane by rays $a$, $b$, $c$, $d$, which have been converged to image points at the image focal plane by the optical elements 45, 7 and 48.

Moreover, if observation of an object is made through window glass, or through air, of unequal densities or irregular refractive indices, serious deterioration of the image is caused by the irregular deflection of image rays and other rays entering the optical system through the outer peripheral zone of the lens 45 adjacent to the rim 43 and reaching the image focal plane.

The effective aperture of my telescope is reduced, so as to exclude from the image focal plane all rays excepting those entering the optical system in an annular zone spaced outward from the mirror 48 and inward from the ring 46, by advancing the masking tube 34 toward the mirror 48, as illustrated in Figs. 1, 10 and 13. If the object under observation is within a finite focal distance, the reflector 7 is adjusted axially by means of the cam 27 to bring the conjugate focal image plane to desired location and size.

As indicated in Figs. 10 and 11 the advancement of the tube 34 excludes from the image focal plane all rays entering the optical system adjacent to the periphery of the mirror 48 and within, say, the rays indicated by the lines $j'$ and $j''$. The masking tube also excludes from the image focal plane all rays entering the focal system adjacent to the ring 46, or outside say, the rays indicated by the lines $k'$ and $k''$. By the forward extension of the masking tube 34, the effective aperture of the telescope is restricted inwardly from the outer periphery of the collecting lens 45 and outwardly from the central zone thereof obstructed by the mirror 48. The further forward the tube is advanced, the narrower will be the effective width of the annular zone of the lens 48 through which rays are admitted and converged to the image focal plane. The effective width of such zone for viewing an object may be varied in accordance with the intensity of the ambient light, both absolute and relative to the intensity of the image rays emanating from the observed object, and in accordance with the irregularities in refringencies produced by tremulous air or striated window glass.

The diameter of the masking tube 34 is approximately the same as, or preferably slightly less than, the diameter of the mirror 48.

In using the telescope, it will ordinarily be desired that the maximum image area at the image focal plane substantially equal the receiving area of the largest eye piece field lens or other optical accessory used with the telescope, and the area of the masking tube should approximate, or be slightly less than, such image area. For optimum results in using my improved telescope in daylight, with a field lens of maximum area the tube 34 should be so advanced that its forward edge will intercept all straight lines which touch the periphery of the mirror 48, cross the optical axis and fall within the above image area. When a field lens of smaller area is used, the effective image area at the image plane of the telescope will also be smaller and hence the tube 34 may be partially retracted and will still be effective to prevent flooding so long as its forward edge intercepts all straight lines which touch the periphery of the reflector 48, cross the optical axis and fall within the reduced image area.

Rays entering the mouth of the tube from the zone adjacent to the periphery of the secondary mirror and striking the wall of such tube but which might tend to form low angle reflections along the inner surface of the tube are intercepted by the flat coils of the helix 36 within the hub.

During darkness, the masking tube should be retracted to a position where it will not interfere with the convergence to the image focal plane of any of the parallel image rays falling on the collecting surface, as indicated in Fig. 8.

When observation of the sun necessitates the interposition of the solar filter, as shown in Figs. 4, 5, and 6, the masking tube 34 may be advanced to its fullest extent to minimize the width of the effective annular zone of the lens 45 and thereby minimize the proportion of light passing the filter which ultimately is converged to the image focal plane. The provision of an air circulating chamber between the filter and dispersing lens prevents the heating and distortion of the latter and the heating of the air trapped in the barrel 1.

It will, of course, be understood that telescopes embodying my invention may be provided with any usual accessories, such as an equatorial support, finder, oculars of different focal length film holder, stereoscopic attachment, etc.

Fig. 13 illustrates the operation of a telescope embodying my invention when a meniscus lens 45$^a$ and concave mirror 48$^a$ of the Maksutov-Gregorian type are substituted for the corresponding elements of the Maksutov-Cassegrainian type. In this modified construction, the extended tube 34 excludes from the image focal plane of the mirror 48$^a$ all rays entering the optical system in close proximity to the peripheries of the members 48$^a$ and 45$^a$, but when the tube 34 is retracted all parallel rays impinging on the surface 50$^a$, outside the periphery of the obstructing mirror 48$^a$, are refracted and reflected to the image focal plane through the retracted tube.

Having described my invention, I claim:

1. A telescope comprising a barrel having a closure at each end thereof, one of said closures forming a meniscus lens and a secondary mirror, a hollow hub supported by the other of said closures, a spring-biased sleeve slidable axially on said hub, a cam mounted on said last named closure for moving said sleeve axially, a primary mirror mounted on said sleeve and air-spaced from said barrel, a spring-biased tube movable along said hub, and means comprising a rotary shaft operatively associated with the tube for imparting lineal movements thereto.

2. A telescope comprising a barrel containing a primary mirror, a meniscus lens complementary to said mirror, and a secondary mirror in the path of rays reflected by said primary mirror, a tube within the barrel movable axially relatively to both of said mirrors and into which rays are reflected by said secondary mirror, a light filter having a metallized surface and carried by a mounting supported on said barrel in front of said lens, said filter, mounting, barrel and lens being arranged to provide an enclosed space between the lens and the filter, said mounting containing staggered apertures forming ventilating vents permitting escape of heated air from the space between said filter and lens, and an actuator outside the optical system of said telescope and operatively associated with said tube for imparting lineal movements thereto independently of said mirrors.

3. A telescope comprising a hollow hub, a primary mirror surrounding and movable along said hub to focus said telescope, a tube movable along said hub to intercept rays reflected by said mirror, a secondary mirror aligned with said tube and reflecting thereinto rays converged by said primary mirror and actuators offset from said tube for moving said tube and primary mirror along said hub.

4. A telescope comprising a centrally apertured primary mirror having an optical axis, telescoping tubular members surrounding said optical axis and intercepting certain rays reflected by said mirror, one of said members being surrounded by and supporting said mirror, a secondary mirror in the path of other rays reflected by said primary mirror, and an actuator comprising a rotary member and a tension member connecting it with the other of said tubular members for moving the latter along said axis.

5. A telescope comprising a barrel having an end closure supporting a central hub, a primary mirror concentric with and supported by and surrounding said hub and movable lineally therealong, a masking tube supported by said hub and movable therealong independently of said mirror, and actuators extending through said closure for moving said mirror and tube independently along said hub.

6. A telescope comprising a barrel having an end closure supporting a central hub, a primary mirror supported by and surrounding said hub and movable lineally therealong, a masking tube telescoped in said hub, a coiled spring within said hub and biasing said tube therefrom, and actuators extending through said closure for moving said mirror and tube independently along said hub.

7. A telescope comprising a hollow hub, a primary mirror supported by said hub concentrically with the axis thereof, said mirror being movable along said hub to focus the telescope, a secondary mirror concentric with said axis and spaced from said primary mirror, and a tube concentric with and movable along said hub to intersect rays reflected from the inner portion of said primary mirror toward said secondary mirror, said secondary mirror being aligned with and spaced from the open end of said tube and reflecting thereinto rays converged by said primary mirror.

8. A telescope comprising a primary mirror having a free floating periphery and an aperture surrounding its optical axis, a plurality of telescoped, concentric, tubular members surrounding said optical axis and intercepting certain rays reflected by the inner portion of said mirror, a secondary mirror coaxial with said primary mirror and in the path of other rays reflected thereby, and a tubular support for said primary mirror supported wholly by and slidable along one of said tubular members.

LAWRENCE E. BRAYMER.

References Cited in the file of this patent

UNITED STATES PATENTS

| Number | Name | Date |
| --- | --- | --- |
| 214,501 | Fritsch et al. | Apr. 22, 1879 |
| 1,176,313 | Pfund | Mar. 21, 1916 |
| 1,222,013 | Michelson | Apr. 10, 1917 |
| 1,249,133 | Lebby | Dec. 4, 1917 |
| 1,267,882 | McFaddin | May 28, 1918 |
| 1,283,963 | Takahashi | Nov. 5, 1918 |
| 1,468,973 | Porter | Sept. 25, 1923 |
| 1,958,859 | Palmer et al. | May 15, 1934 |
| 2,242,317 | Metcalf | May 20, 1941 |
| 2,322,395 | Sheppard | June 22, 1943 |
| 2,401,191 | Rosett | May 28, 1946 |
| 2,413,286 | Buchele | Dec. 31, 1946 |
| 2,435,074 | Fry | Jan. 27, 1948 |
| 2,504,383 | Bouwers et al. | Apr. 18, 1950 |

FOREIGN PATENTS

| Number | Country | Date |
| --- | --- | --- |
| 82,671 | Germany | Aug. 7, 1895 |
| 344,019 | France | Aug. 23, 1904 |
| 232,892 | Great Britain | Apr. 30, 1925 |
| 349,295 | Italy | June 10, 1937 |
| 884,415 | France | Apr. 27, 1943 |

OTHER REFERENCES

Bouwers: "Achievements in Optics," pages 53 through 59, published by Elsevier Publishing Co., New York, N. Y., 1946.